United States Patent [19]

Buggele

[11] 4,192,519

[45] Mar. 11, 1980

[54] HIGH PRESSURE MULTI-PURPOSE SEAL

[76] Inventor: Alvin E. Buggele, 7 Milan Manor Dr., Milan, Ohio 44846

[21] Appl. No.: 927,479

[22] Filed: Jul. 24, 1978

[51] Int. Cl.² ............................................. F16J 15/12
[52] U.S. Cl. .................................. 277/115; 277/124; 277/125; 277/117; 277/170; 277/188 A
[58] Field of Search ............................. 277/168–172, 277/115, 116, 117, 118, 119–125, 188 R, 188 A, 190, 192, 199, 236

[56] References Cited

U.S. PATENT DOCUMENTS

| | | | |
|---|---|---|---|
| 66,758 | 6/1867 | Webster | 277/116 |
| 911,808 | 2/1909 | Condon | 277/124 |
| 1,968,650 | 7/1934 | Mastin | 277/124 |
| 2,791,194 | 5/1957 | Janise | 277/120 X |
| 2,989,209 | 6/1961 | Hersman | 277/170 X |
| 3,907,307 | 9/1975 | Maurer et al. | 277/124 X |

FOREIGN PATENT DOCUMENTS

| | | | |
|---|---|---|---|
| 7258 | 9/1879 | Fed. Rep. of Germany | 277/124 |
| 134535 | 9/1902 | Fed. Rep. of Germany | 277/117 |
| 250272 | 6/1948 | Switzerland | 277/124 |
| 6300 | of 1887 | United Kingdom | 277/120 |
| 3754 | of 1902 | United Kingdom | 277/120 |
| 428782 | 5/1935 | United Kingdom | 277/123 |
| 504841 | 5/1939 | United Kingdom | 277/116 |
| 1074629 | 7/1967 | United Kingdom | 277/171 |

*Primary Examiner*—Robert S. Ward, Jr.
*Attorney, Agent, or Firm*—David D. Murray; Vincent L. Barker, Jr.

[57] ABSTRACT

A high pressure multi-purpose seal for use with pressure vessels and other equipment requiring demountable access fittings withstands pressures thousands of times above atmospheric pressure at both cryogenic and elevated temperatures. The cryogenic high pressure seal comprises a stack of indium, brass and fluorocarbon plastic sealing rings disposed about an access opening in the pressure vessel. A gland nut type closure is tightened against the seal stack which compresses it and causes the indium rings to extrude and seal against the closure and pressure vessel walls. The seal exhibits negligible leakage and provides exceptional pressurization and depressurization cycle life at both high pressures and cryogenic temperatures. The instant invention also comprehends a high pressure seal suitable for use at elevated temperatures (370° to 400° Celsius or 700° to 750° Farenheit). Substitution of aluminum rings or rings of a material having similar temperature and stress characteristics for the indium rings and substitution of perfluorelastomer rubber rings for the fluorocarbon plastic rings extends the operational temperature range of the seal upward several hundreds of degrees.

16 Claims, 4 Drawing Figures

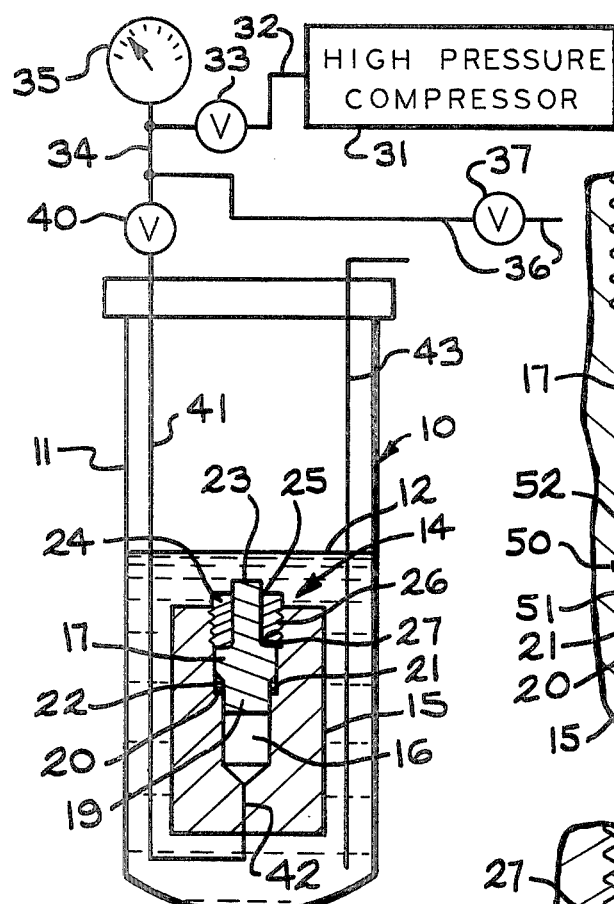
FIG. 1
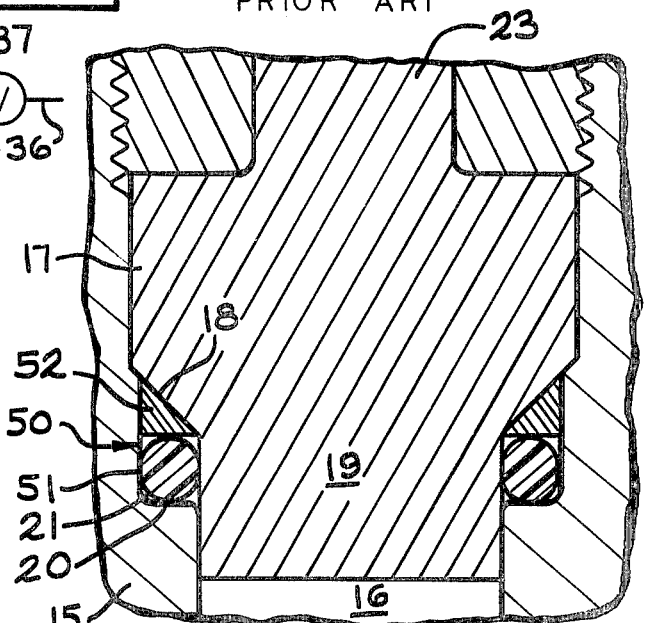
FIG. 2 PRIOR ART
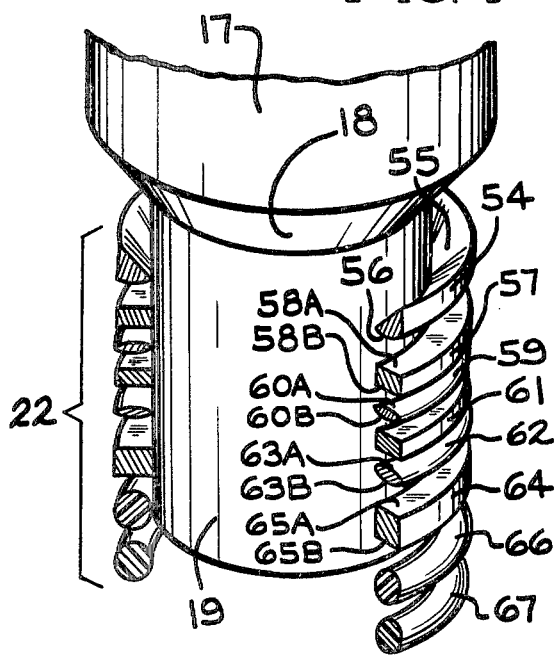
FIG. 3
FIG. 4

HIGH PRESSURE MULTI-PURPOSE SEAL

BACKGROUND OF THE INVENTION

The invention relates generally to a high pressure seal and specifically to a seal for use in pressure vessels as well as manufacturing and research equipment operating at pressures as great as 100,000 p.s.i. and temperatures several hundreds of degrees above and below ambient.

The behavior of various substances at extremely high pressures and temperatures approaching absolute zero as well as several hundreds of degrees above ambient is becoming the subject of expanding basic research and experimentation. The prospect of a technology based upon the characteristics and performance of substances subjected to such extremes has prompted both the government to fund basic research and private interests to attempt to utilize such knowledge.

Examination of the chemical and physical properties of substances subjected to high pressure requires sophisticated equipment, such as high pressure compressors, pressure vessels and pressure vessel seals which are capable of maintaining their mechanical and structural integrity at pressures as high as 50,000 p.s.i. or even 100,000 p.s.i.

The design criteria for pressure vessels have been well established. A typical pressure vessel may have an internal volume of from 300 to 500 cubic centimeters (18 to 30 cubic inches) while large pressure vessels may contain several thousands of times these internal volumes. Such a pressure vessel is typically of monoblock construction, fabricated of annealed 304 stainless steel, and includes a closure and threaded gland nut also of 304 stainless steel, as well as a seal disposed between the closure and pressure vessel. The operating pressure limit of such vessels is generally in the vicinity of 40,000 p.s.i. Larger pressure vessels for both cryogenic or high temperature applications are preferably fabricated by forging from 9% nickel steel. Such vessels exhibit yield strengths of approximately 110,000 p.s.i. and increase operating pressure limits proportionately.

Likewise, the design goals for pressure vessel seals have been well established. For example, P. W. Bridgman in *The Physics of High Pressure* (1949) described various high pressure seals and postulated his principle of unsupported area. Subsequently, Chua, Terry and Ruoff disclosed a multi-part, small (approximately one inch outside diameter, one-half inch inside diameter) seal incorporating indium and brass components which utilized Bridgman's unsupported area principle.

High pressure research is often directed to the frontiers of knowledge and technology. Consequently, pressure vessel technology has occasionally failed to keep pace with the demands placed upon it by increasingly sophisticated high pressure research. Such was the situation as research into the properties of substances subjected to both high pressure and low temperature began. Large pressure vessel seals which could withstand both pressure as high as 4080 bars (60,000 p.s.i.) and temperature as low as that of liquid helium (4.2 Kelvin) do not exist.

As the sophistication of manufacturing processes has increased, similar situations, i.e., disparities between seal capabilities and seal requirements, have become manifest in this field also. For example, the cracking of oil tar sands to produce petroleum distillates is performed at extremely high pressure and elevated temperature. Existing seals have limited reliability and pressure cycle life at these conditions. At the present time, there are no wholly satisfactory seals for this application.

The difficulties of operation at such extremes in temperature and pressure are manifold. First of all, the pressure vessel and thus the seal is subjected to a dimensional change as the vessel is pressurized. When a typical 304 stainless steel pressure vessel having a cavity diameter of 7.612 centimeters (3.0 inches) is subjected to a pressure of 1530 bars (22,500 p.s.i.) the width of the gap between the top closure and walls of the pressure vessel occupied by the seal increases by approximately 0.0137 millimeters (0.00054 inches) at ambient temperature. At cryogenic temperatures, such gap width increase is reduced. For example, at the temperature of liquid nitrogen (77.3° Kelvin) the width of the seal increases by 0.0096 millimeters (0.00038 inches) and at the temperature of liquid helium (4.2° Kelvin) the seal width increase is reduced to 0.0074 millimeters (0.0003 inches).

Although such reduced dimensional changes at cryogenic temperatures might initially suggest that this difficulty is of reduced significance at reduced temperatures, precisely the reverse is true. First of all, since the majority of all components exhibiting any sealing capability are fabricated of materials other than 304 stainless steel, the seal components will exhibit a different thermal shrinkage due to their unique thermal coefficient of expansion. Thus, the temperature change from ambient to near absolute zero will produce a disparate and additional dimensional change between the seal components and the pressure vessel in addition to that dimensional change caused by the pressurization of the vessel. For example, the thermal coefficient of expansion of silicon rubber, a typical seal material, is approximately ten times larger than the thermal coefficient of expansion of 304 stainless steel. If the coefficients of expansion for both materials are assumed to remain constant from room temperature to the temperature of liquid nitrogen, a corresponding differential between the pressure vessel diameter and the seal diameter results.

Secondly, since seal components are generally fabricated of one of a variety of resilient materials such as silicon rubber, Buna-N, fluorocarbon rubber or Teflon, as the temperature is reduced the seal material becomes brittle and inflexible, looses compressibility and is apt to fracture. Inasmuch as it is deemed apparent why such resilient materials are especially suited for utilization as seal components, it is likewise deemed apparent why the loss of such resiliency and compressibility renders them unsuitable for low temperature seal applications.

In addition to this temperature related problem, conventional resilient seal components exhibit a pressure related difficulty. During pressurization, gas within the pressure vessel diffuses into the seal material. Upon depressurization, this diffused gas cannot escape and blisters and occasionally fractures the entire cross section of the seal. This problem is aggravated by increasing the cycle rate at which the pressurization-depressurization sequence occurs. Although this difficulty becomes apparent only at the conclusion of a pressurization trial, it renders the affected seal components unusable and necessitates disassembly of the pressure vessel seal and replacement of such damaged components. In addition to the obvious cost of replacement of a seal component and the time consumed to replace it, such single cycle reliablility is impractical in any application requiring repeated pressurization and depressurization without disassembly.

It is therefore clear that conventional pressure vessel seals which may function acceptably at ambient temperature are increasingly subject to thermal contraction mismatch and loss of resilience as operating temperatures lower and approach absolute zero. These difficulties have their analogs as the operating temperature of the pressure vessel is elevated above ambient. The problem of mismatch between the thermal coefficients of expansion of the pressure vessel and the seal material is, of course, analogous but for the fact that the seal material now expands more than the pressure vessel and may be subject to undue deformation. Similarly, at elevated temperatures lack of seal resilience is no longer a problem but excessive resilience is. Most of the resilient materials delineated above become soft and subject to uncontrolled distortion and extrusion. If the temperature is sufficiently high, the seal material will extrude due to the high pressure and become permanently deformed. While this problem is, of course, a matter of degree, these materials generally function unsuitably at all but relatively low pressures and temperatures near ambient.

Numerous solutions to the difficulties discussed above have been suggested. Single O-ring seals of silicon rubber and Buna-N were found to be subject to blisters and fractures due to diffused gas. Creavey seals consisting of Teflon (fluorocarbon resin) tubular torus having a stainless steel resilient spring inside with a Viton (fluoroelastomer) core at its center have been found to repeatedly fail due to distortion at the junction of the outer Teflon jacket. Various combinations of metallic and resilient O-ring seals have also been attempted but with decreasing success as operating temperatures approach absolute zero. Attempts to increase the radial compression O-ring seals by the use of oversize cross section and oversize mean diameter O-rings has also met with limited success. Such oversize components lead to problems during installation which cause twisting and distortion of the O-rings, excessive squeeze and excessive compressive loadings. Inoperable seals and/or reduced life are generally the result of such attempts at oversizing. The use of lubricants to facilitate the assembly process has been found to cause extensive O-ring rupture.

At least one-structural solution to the dimensional change problem has been suggested. It is the process of pre-pressurization and it entails pressurizing the vessel prior to lowering (or raising) its temperature. The previously delineated seal types and materials exhibit somewhat improved performance when pre-pressurized but this process severely inhibits operational flexibility in that the seals will not withstand pressure cycling at the reduced (or elevated) temperature. This can be a serious drawback since it, in effect, requires that the pressure vessel be warmed (or cooled) to ambient at the beginning of every pressure cycle to perform the pre-pressurization step—a process that takes several hours. In other words, a seal which will function satisfactorily only if pre-pressurized, will not function properly in an application where it is necessary or desirable to perform repeated pressurization-depressurization cycles without returning to ambient temperature.

SUMMARY OF THE INVENTION

The instant invention comprehends a high pressure multi-purpose seal for use in pressure vessels and diverse applications requiring demountable seals which maintain their integrity at extremes of temperature and pressure. The seal comprises a stack of metal bands or annuli and resilient O-rings disposed longitudinally in an annular cavity between the pressure vessel and its closure. For cryogenic temperatures, the seal comprises a stainless steel wedge having a convex surface adjacent the stack and an inclined wedge surface in contact with a correspondingly inclined circumferential surface on the pressure vessel closure, an indium annulus having a rectangular cross section, a brass annulus or anvil having axial convex faces, a second indium annulus having a rectangular cross section, a second brass annulus or anvil having convex faces, a third indium annulus having a rectangular cross section and axial thickness approximately twice that of the other two indium annuli, and two Kel-F O-rings. Kel-F is a registered trademark of the Minnesota Mining and Manufacturing Company for its brand of fluorocarbon plastic. The indium annuli have a rectangular cross section when new but are compressed and extruded by the brass anvils and thus, after having been used once, assume a concave curvature on their axial ends which is complementary to the radius of curvature of the brass anvils. Either new (rectangular) or used (concave) indium annuli may be used in the seal of the instant invention.

For elevated temperature operation as high as 400° Celsius (750° Fahrenheit) the Kel-F O-rings are replaced by Kalrez O-rings and the indium annuli are replaced by aluminum annuli of the same configuration. Kalrez is a registered trademark of the DuPont Company for its brand of perfluoroelastomer rubber.

The sealing mechanism of the seal is dual-mode. First of all, the annuli of an ambient temperature extrudable material (such as indium or aluminum) is compressed and extruded by the compressive force of the tightened closure—the O-rings providing sufficient resilient cushion to ensure an appropriate quantum of extrusion. Secondly, during the pressurization cycle, the O-rings function as a pneumatic piston and further compress the seal components and the extrudable material causing the extrudable material to fill any voids which have developed due to the diametral expansion of the pressurized vessel resulting from pressurization or temperature increase or contraction of the pressurized vessel due to temperature reduction. The extrudable material must exhibit plastic flow at the temperature and pressure to which the seal is subjected to maintain the integrity of the seal. Indium extrudable annuli in a seal intended for use at cryogenic temperatures are thus preferred whereas aluminum annuli or annuli of a material having similar temperature/compressive yield strength characteristics are preferred for temperatures markedly above ambient.

The seal comprising the foregoing eight components is especially intended for use with laboratory pressure vessels but may be scaled up and used as is herein disclosed to seal openings typically encountered in high pressure manufa turing processes such as cracking oil tar sands.

This high pressure multi-purpose seal exhibits exceptionally low leakage rates on the order of eight standard cubic centimeters per minute when pressurized to 1430 bars (21,000 p.s.i.) at 77.3° Kelvin (−196° Celsius). Furthermore, such minimal seal leakage is maintained throughout several pressurization/depressurization cycles. The seal invention was successfully tested at a maximum pressure of 2720 bars (40,000 p.s.i.) which was the design limit of the pressure vessel. Performance of the seal at this pressure indicates that its upper operational limit is substantially above 40,000 p.s.i.

A model high pressure vessel embodying the seal system of the instant invention has been constructed and operated. The results of such construction and operation are discussed in National Aeronautics and Space Administration Technical Memorandum X-73680 published in the fall of 1977 and presented at the Sixth International High Pressure Conference, Boulder, Colo. July 25-29, 1977. Results of tests to 2720 bars (40,000 p.s.i.) on the seal invention are discussed in NASA Tech Brief No. LEW 12944 to be published late in 1978.

Thus, it is the object of the instant invention to provide a general purpose seal capable of withstanding pressures at least as high as 2720 bars (40,000 p.s.i.).

It is a further object of the instant invention to provide a high integrity seal at both cryogenic temperatures approaching absolute zero and elevated temperatures as high as 400° Celsius (750° Fahrenheit).

It is a still further object of the instant invention to provide a high pressure seal for use over a broad range of temperatures in pressure vessels and allied applications.

It is a still further object of the instant invention to provide a multi-purpose high pressure seal which functions satisfactorily after repeated pressurization and depressurization.

It is a still further object of the instant invention to provide a high pressure multi-purpose seal which does not require pre-pressurization.

BRIEF DESCRIPTION OF THE DRAWINGS

FIG. 1 is a diagrammatic sectional view of a pressure vessel positioned within a dewar;

FIG. 2 is a fragmentary, sectional, diagrammatic view of a high pressure seal known in the prior art;

FIG. 3 is an exploded, perspective view of a high pressure seal according to the instant invention; and FIG. 4 is a fragmentary, sectional view of a high pressure seal according to the instant invention.

DESCRIPTION OF THE PREFERRED EMBODIMENT

Referring now to FIG. 1, a typical cryogenic pressure vessel laboratory apparatus is denominated by the reference numeral 10. The apparatus 10 comprises a dewar 11 containing a cryogenic fluid 12. The cryogenic fluid 12 may be one of a number of liquified gases such as helium or nitrogen and maintains the interior of the dewar at a temperature corresponding to the boiling point of the liquified gas. For example, liquified helium utilized as the cryogenic fluid 12 will maintain the interior of the dewar 11 at a temperature of approximately 4.2° Kelvin (−269° Celsius), whereas liquified nitrogen will maintain the interior at a temperature of approximately 77.3° Kelvin (−196° Celsius). Also contained within the dewar 11 is the pressure vessel assembly 14. The pressure vessel assembly 14 comprises an outer, generally cylindrical pressure vessel 15. The pressure vessel 15 is preferably fabricated of 304 stainless steel and defines a pressure cavity 16. The cavity 16 extends to one end of the pressure vessel 15 and in operation is closed by a plug or closure 17 which also is preferably fabricated of 304 stainless steel. The closure 17 includes a reduced diameter portion at each end. At the end of the closure 17, more proximate the pressure cavity 16, is a tapering conical surface 18 (shown in FIG. 3) which joins the larger diameter, center portion of the closure 17 with a reduced diameter, coaxially disposed portion 19.

The inner wall of the pressure vessel 15 defines a radial shoulder 20 which is disposed substantially normal to the longitudinal axis of the vessel 15. The shoulder 20, the inner wall of the pressure vessel 15, the surface 18 and the reduced diameter portion 19 of the closure 17 thus define a seal cavity 21. The seal cavity 21 contains a plurality of metallic and fluorocarbon plastic sealing rings which constitute the high pressure seal assembly 22. The high pressure seal assembly 22 will be described in further detail subsequently.

The closure 17 also includes a coaxially disposed reduced diameter extension 23 at its end most distant the pressure cavity 16. The extension 23 provides mechanical centering for a gland nut 24. The gland nut 24 includes a concentric opening 25 of somewhat larger diameter than the extension 19 and further includes male threads 26 about its periphery which engage matching female threads 27 disposed on the inner surface of the pressure vessel 15. The periphery of the gland nut 24 at the end opposite the male threads 26 defines a plurality of radial openings (not shown) which facilitate tightening of the gland nut 24 within the pressure vessel 15 in a conventional fashion.

A typical cryogenic pressure vessel apparatus 10 also includes means for supplying and monitoring the high pressure which is supplied to the pressure vessel cavity 16 and means for supplying a cryogenic liquid. Such means include a high pressure compressor 31 connected by suitable lines 32 through a shutoff valve 33 to a manifold 34. The high pressure compressor 31 must, of course, be capable of delivering the maximum pressure required during a pressure trial and may be like or similar to the devices manufactured by the Haskell Engineering Company of Burbank, Calif. The shutoff valve 33 selectively isolates the high pressure compressor 31 from the manifold 34 as is apparent from FIG. 1. The manifold 34 further preferably includes a pressure gauge or indicating device 35 which indicates the instantaneous pressure in the manifold 34. Also tied to the manifold 34 is an additional line 36 which incorporates a shutoff valve 37 which may be used to bleed off pressure in the manifold 34 and pressure cavity 16, sample the pressurized gas within the manifold 34 or other operation required by the instant experiment. An additional shutoff valve 40 links the manifold 34 and the lines 32 and 36 in communication therewith with another line 41 which communicates with the pressure cavity 16 through a passageway 42 in the pressure vessel 15. It should thus be apparent that the cavity 16 may be pressurized by the high pressure compressor 31 while various samples are added or withdrawn through the line 36 while the pressure is monitored by the pressure gauge 35. An additional supply line 43 may be utilized to fill and withdraw an appropriate cryogenic fluid from the dewar 11.

Referring now to FIG. 2, a prior art pressure seal assembly which provides unsatisfactory sealing at cryogenic temperatures is generally denominated by the reference numeral 50. The seal 50 comprises an O-ring seal 51 in the seal cavity 20 and a 304 stainless steel miter wedge 52. The O-ring seal 51 may be one of the materials previously described, such as Buna-N, silicon rubber, Teflon and Creavey seals. At or above liquid nitrogen temperatures (77.3° Kelvin), all such seals tested have failed. Pressure achieved under cryogenic conditions with such seals never exceeded several hundred bars.

The components of the high pressure seal 22 of the instant invention in an unused condition are illustrated in FIG. 3. Starting at the top of the stack of eight generally annular components is a wedge backup ring 54. The backup ring 54 is preferably of the same material as the pressure vessel and in this instance is of 304 stainless steel. The backup ring 54 defines an upper inwardly sloping surface 55 inclined at an angle equal to the inclination of the tapering conical surface 18. In the model high pressure vessel and seal, the angle of inclination of the surfaces 18 and 56 was approximately 45° from the vertical. The backup ring 54 also defines a lower surface 56 having a convex curvature. The radius of curvature of the convex lower surface 56 in the model was approximately 12.4 millimeters (0.490 inches). The second element of the seal 22 is an indium annulus 57 having flat or, if the annulus was previously used, concave upper and lower surfaces 58A and 58B which if previously used and hence concave have a radius of curvature which matches that of the convex surface of the backup ring 54. The indium metal of the annulus 57 is preferably in a fully annealed condition and has a purity of from 99.9% to 99.99%. The third element of the seal 22 is a brass annulus or anvil 59 having upper and lower convex surfaces 60A and 60B, respectively, having a radius of curvature preferably equal to that of the convex surface 56 of the backup ring 54. The inner and outer edges of the brass anvil 59, formed by the intersecting convex surfaces 60A and 60B are not knife-edged but preferably have vertical inner and outer deburred, flated edges having a height of 0.013 to 0.026 millimeters. The brass, too, is preferably in a fully annealed condition. The fourth element of the seal 22 is another indium annulus 61 which is preferably identical to the indium annulus 57. Thus, it, too, may have either flat or concave upper and lower surfaces depending upon whether it has not been or has been previously used. The fifth element of the seal 22 is a second brass annulus or anvil 62 which is preferably identical to the brass anvil 59, that is, it defines upper end lower convex surfaces 63A and 63B which meet at the inner and outer diameter of the anvil 59 to form deburred, flated edges. The sixth element of the seal 22 is another indium annulus 64 having upper and lower flat or concave surfaces 65A and 65B, again depending upon whether it is new or used. The thickness of the indium annulus 64 in a direction parallel to the axis of the stack is approximately twice that of the indium annulus 57. The seventh and eighth elements of the seal 22 are Kel-F, that is, fluorocarbon plastic, O-rings 66 and 67.

The high pressure seal 22 just described is intended for use at cryogenic temperatures approaching absolute zero. If operation of the pressure vessel above ambient temperatures and up to 400° Celsius (750° Fahrenheit) is contemplated, the integrity of the seal may be maintained by the substitution of correspondingly formed annuli of aluminum or other material having similar temperature/compressive tensile strength parameters for the indium annuli 57, 61 and 64, as well as the substitution of Kalrez, that is, perfluoroelastomer rubber, O-rings for the Kel-F O-rings 66 and 67.

Referring now to FIG. 4, the assembled high pressure seal 22 is illustrated with the closure 17 in position on the pressure vessel 15 and the gland nut 24 tightened.

In a pressure vessel 15 having a height of approximately 37 centimeters and wherein the volume of the pressure cavity 16 is approximately 435 cubic centimeters (26.5 cubic inches), the dimension A will typically be 0.479 centimeters (0.188 inches). The dimension B will be 2.159 centimeters (0.85 inches), the dimension C will be 1.27 millimeters (0.050 inches) and the dimension D will be approximately 7.612 centimeters (3.0 inches). In such a pressure vessel, the preferred cross sectional diameter of the Kel-F O-rings 66 and 67 will be approximately 5.385 millimeters (0.212 inches). The radial thickness of the remaining components of the seal 22, i.e., the thickness of the components corresponding to the dimension A, should be sized to provide a loose friction fit against the inner and outer walls of the 0.479 centimeter (0.188 inch) seal cavity. The inner diameter of these components in a pressure vessel having a dimension D of 7.612 centimeters (3.0 inches) as stated should preferably be between 0.025 and 0.051 millimeters (0.001 and 0.002 inches) greater than the diameter of the closure 17.

An inherent feature of the multi-purpose high pressure seal of the instant invention is its simplicity and adaptability to various high pressure seal applications. Utilization of the instant seal invention begins with selection of the eight components of the seal 22 and their assembly into the stack illustrated in FIG. 3. The metallic components of the seal, namely the stainless steel backing ring 54, the two convex brass anvils 59 and 62 and the three indium annuli 57, 61 and 64 may be new or may have been previously used. Generally speaking, the metallic rings should be in a fully annealed condition and carefully inspected for obvious surface aberrations. Furthermore, used indium rings should be prepared for reuse by scoring the inner and outer diameter surfaces with a fine stainless steel wire brush to ensure a uniform surface. This is deemed to be a necessary precaution inasmuch as the annuli 57, 61 and 64 which have been previously used will fit snugly about the closure reduced diameter portion 19 and their removal therefrom may longitudinally scar their inner surfaces. It has been found that such longitudinal scars will cause a seal to fail if not removed. The closure 17, including the seal assembly 22, is then positioned within the pressure vessel 15 and the gland nut 24 threaded into the pressure vessel 15. In a pressure vessel 15 of the size described, i.e., having a diameter of the closure 17 of 7.612 centimeters, the gland nut 24 should be tightened with an applied torque of approximately 69 kilogram-meters (500 foot-pounds).

It should be noted that the dimensions recited herein are exemplary in nature and are not intended to circumscribe the size limits of pressure vessels and closure diameters to which the instant invention may be applied. Rather, the instant seal is equally suitable for use with openings requiring high pressure high pressure seals as large as 61 centimeters (24 inches) in diameter and larger which may be utilized in manufacturing operations or large, high pressure research and experimentation facilities. As the diameter of the closure 17 and gland nut 24 increases beyond the 7.612 centimeter (3 inch) closure 17 described herein, a proper seal can be achieved by increasing the applied closure torque in proportion to the diameter.

The closure torque and the compression which it applies to the components of the seal, particularly the indium annuli 57, 61 and 64, is an important and necessary consideration of the dual-mode sealing mechanism which compensates for pressure vessel expansion while maintaining sufficient flexibility to also compensate for thermal contraction. The melting point of indium is approximately 156.17° Celsius (313° Fahrenheit) and exhibits a tensile and/or compressive yield stress of from 21.8 to 36.2 kilograms/square centimeter (310 to 515 p.s.i.). The compressive force generated by the tightening of the gland nut 24 extrudes the indium annuli 57, 61 and 64 due to its low compressive yield strength and effects a secure and, by comparison to most other metals, relatively resilient seal. The second consideration of the dual-mode sealing mechanism is the compressive force on the seal resulting from the internal pressure in the pressure vessel. Increasing vessel pressure supplements the compression/extrusion seal mechanism by means of the double O-rings which function as a pneumatic piston to provide a sustained compressive force which enables continuous extrusion of the indium (or aluminum) annuli. The extruded indium (or aluminum) sealing rings sandwiched between the anvil rings are compressed with increasing force as pressure within the pressure vessel increases resulting in plastic flow, thus causing the sealing rings to extrude further past the convex surface 56 of the backup ring 54 and thereby increase the total indium (or aluminum) seal surface area in contact with the present vessel.

In tests performed on the seal of the instant invention, the dewar 11 was filled with liquid nitrogen at 77.3° Kelvin (−196° Celsius) and the pressure vessel cavity 16 was pressurized by the high pressure compressor 31 to a pressure of 1430 bars (21,000 p.s.i.). Such pressurization revealed an average 7.374 standard cubic centimeter per minute seal leakage over a 16 hour pressure decay period. After four rapid depressurization cycles to less than 3 bars (46 p.s.i.), seal leakage increased to 283 standard cubic centimeters per minute. Rapid depressurization, that is depressurizations taking less than 3 seconds, of the pressure vessel cavity 16 is considered to be a worst case situation inasmuch as such depressurization greatly aggravates premature failure of the Kel-F O-rings 66 and 67 due to the rapid expansion of gases which diffuse thereinto during the high pressure phase of a cycle and seal movement within the seal cavity 21. The foregoing data suggests excellent seal life under normal conditions of operation. Similar results were achieved when the cryogenic fluid 12 was liquid helium at a temperature of 4.2° Kelvin (−269° Celsius) rather than liquid nitrogen.

As stated previously, the seal of the instant invention is also usable at temperatures well above ambient upon the substitution of certain components of the seal 22. Operating temperatures as high as 400° Celsius (750° Fahrenheit) are achievable with aluminum annuli substituted for the indium annuli 57, 61 and 64 and Kalrez O-rings substituted for the Kel-F O-rings 66 and 67. In view of the melting point of indium, 156.17° Celsius (313° Fahrenheit), the necessity of the substitution of a higher melting point material is manifest. The melting point of aluminum is 660.1° Celsius (1,220° Fahrenheit) and it further exhibits a thermal coefficient of expansion and tensile strength at elevated temperatures similar to that of indium at below ambient temperatures. The aluminum, like the indium, must be in a fully annealed condition. The substitution of Kalrez O-ring for the Kel-F O-rings 66 and 67 is also dictated by the instability and excessive plastic flow of Kel-F O-rings under high pressure-high temperature conditions. The Kalrez O-rings exhibit superior dimensional stability and resistance to excessive deformation and plastic flow at and below the stated temperatures.

Under routine pressure vessel operating procedures, the pressure vessel cavity 16 may undergo only a single cycle of pressurization and depressurization at the conclusion of which the gland nut 24 would be removed and the seal disassembled. As noted previously, the metallic components of the seal 22 may be reused but the Kel-F or Kalrez O-rings 66 and 67 are discarded. The reuse of the metallic components of the high pressure seal 22, particularly the indium annuli 59, 61 and 64 lowers the overall operating expense of the instant seal and is a benefit in addition to the improved sealing characteristics thereof.

In view of the foregoing statements regarding the reusability of certain components of the seal, it should be apparent that cost was a consideration in arriving at the best mode seal configuration herein disclosed. It is known that the utilization of additional pairs of extrudable annuli and extruding anvils as well as additional O-rings further minimizes the leakage rate and improves the overall performance of the seal inasmuch as such a configuration results in increased surface/sealing area between the pressurized vessel and closure and the extruded material. However, since such improved performance is small in relationship to the increased cost and complexity of the seal, a configuration representing an optimum compromise between seal performance and seal complexity has been disclosed herein.

The foregoing disclosure is the best mode devised by the inventor for practicing this invention. It is apparent, however, that structures incorporating modifications and variations of the instant invention will be obvious to one skilled in the art of high pressure seals. Inasmuch as the foregoing disclosure is intended to enable one skilled in the pertinent art to practice the instant invention, it should not be construed to be limited thereby. Rather, the invention should be construed to include such aforementioned obvious variations and be limited only by the spirit and scope of the following claims.

What I claim is:

1. An apparatus for achieving a seal between a container defining an enclosed volume and a closure comprising a plurality of axially aligned bands disposed about said closure including a band having a substantially triangular cross section adjacent said closure, a first plurality of metallic bands, a second plurality of metallic bands having a double convex cross section interleaved with said first plurality of metallic bands and at least one band having a substantially circular cross section.

2. The apparatus of claim 1, wherein said container, closure and triangular cross section band are fabricated of the same material.

3. The apparatus of claim 1, wherein said triangular cross section band further includes a convex surface adjacent one of said first plurality of metallic bands.

4. The apparatus of claim 1, wherein said first plurality of metallic bands is indium and said circular cross section band is fluorocarbon plastic.

5. The apparatus of claim 1, wherein said first plurality of metallic bands is aluminum and said circular cross section band is perfluoroelastomer rubber.

6. The apparatus of claim 1, wherein said second plurality of metallic bands has a double convex cross section and is brass.

7. An apparatus for effecting a seal comprising, in combination, a plurality of components disposed in stacked relationship, including a backup ring having a substantially triangular cross section, a first plurality of bands of a first metal, a second plurality of bands of a second metal interleaved with said first plurality of bands, at least one band having a substantially circular cross section and means for applying compressive force to said plurality of components, whereby when said force applying means is activated, said first plurality of bands is extruded by said backup ring and said second plurality of bands.

8. The apparatus of claim 7, wherein said container, closure and triangular cross section band are fabricated of the same material.

9. The apparatus of claim 7, wherein said first plurality of metallic bands is indium and said circular cross section band is fluorocarbon plastic.

10. The apparatus of claim 7, wherein said first plurality of metallic bands is aluminum and said circular cross section band is perfluoroelastomer rubber.

11. A seal apparatus for use with a container defining an opening and a closure securable thereinto, comprising, in combination, extrudable metallic means for forming a seal between said closure and said container, at least two anvil means for extruding said metallic means when said metallic means is subjected to pressure, means for subjecting said extrudable metallic means and said anvil means to pressure, and O-ring means for resiliently seating said extrudable metallic means and said anvil means within said opening of said container.

12. The seal apparatus of claim 11, wherein said extrudable metallic means comprises a plurality of indium rings, said anvil means comprises a plurality of brass rings having a double convex cross section interleaved with said indium rings and said O-rings means comprises at least one fluorocarbon plastic O-ring.

13. The seal apparatus of claim 11, wherein said extrudable metallic means comprises a plurality of aluminum rings, said anvil means comprises a plurality of brass rings having a double convex cross section interleaved with said aluminum rings and said O-ring means comprises at least one perfluoroelastomer rubber O-ring.

14. An apparatus for effecting a seal between first and second separable components comprising, in combination, at least two extrudable means for providing an extruded seal between such first and second separable components when subjected to pressure, at least three anvil means interleaved with said extrudable means for extruding said extrudable means, and at least one O-ring means for resiliently seating said extrudable means and said anvil means.

15. The apparatus of claim 14, wherein said extrudable means comprises indium rings, said anvil means comprises brass rings having a double convex cross section and said O-ring means comprises a fluorocarbon plastic O-ring.

16. The apparatus of claim 14, wherein said extrudable means comprises aluminum rings, said anvil means comprises brass rings having a double convex cross section and said O-ring means comprises a perfluoroelastomer rubber O-ring.

* * * * *